United States Patent

[11] 3,564,991

| [72] | Inventor | Ennio Longinotti<br>Brescia, Italy |
|---|---|---|
| [21] | Appl. No. | 763,053 |
| [22] | Filed | Sept. 23, 1968 |
| [45] | Patented | Feb. 23, 1971 |
| [73] | Assignee | Doglioni Majer Aldo<br>Milan, Italy |
| [32] | Priority | Sept. 30, 1967 |
| [33] | | Italy |
| [31] | | 2802/67 |

[54] APPARATUS TO MAKE COFFEE CREAM BY MEANS OF CENTRIFUGATION
15 Claims, 3 Drawing Figs.

[52] U.S. Cl. .................................................. 99/289
[51] Int. Cl. ................................................ A47j 31/22
[50] Field of Search ......................................... 99/289,
290, 279; 233/20, 19, 27, 28, 34, 46

[56] References Cited
UNITED STATES PATENTS

| 686,917 | 11/1901 | Baker | 233/20 |
| 1,869,720 | 8/1932 | Strand | 99/289 |
| 3,233,535 | 2/1966 | Fowlie | 99/289 |

*Primary Examiner* — Robert W. Jenkins

ABSTRACT: A centrifuging apparatus for making coffee is formed of rotating wall means including an inner sleeve and an outer sleeve and attached flange members which combine to form a centrifuging chamber in communication with a coffee collection chamber by means of a narrow filtering passageway. The sleeves are axially displaceable relative to one another for opening the centrifuging chamber and discharging any used coffee deposit from the outer periphery of the chamber.

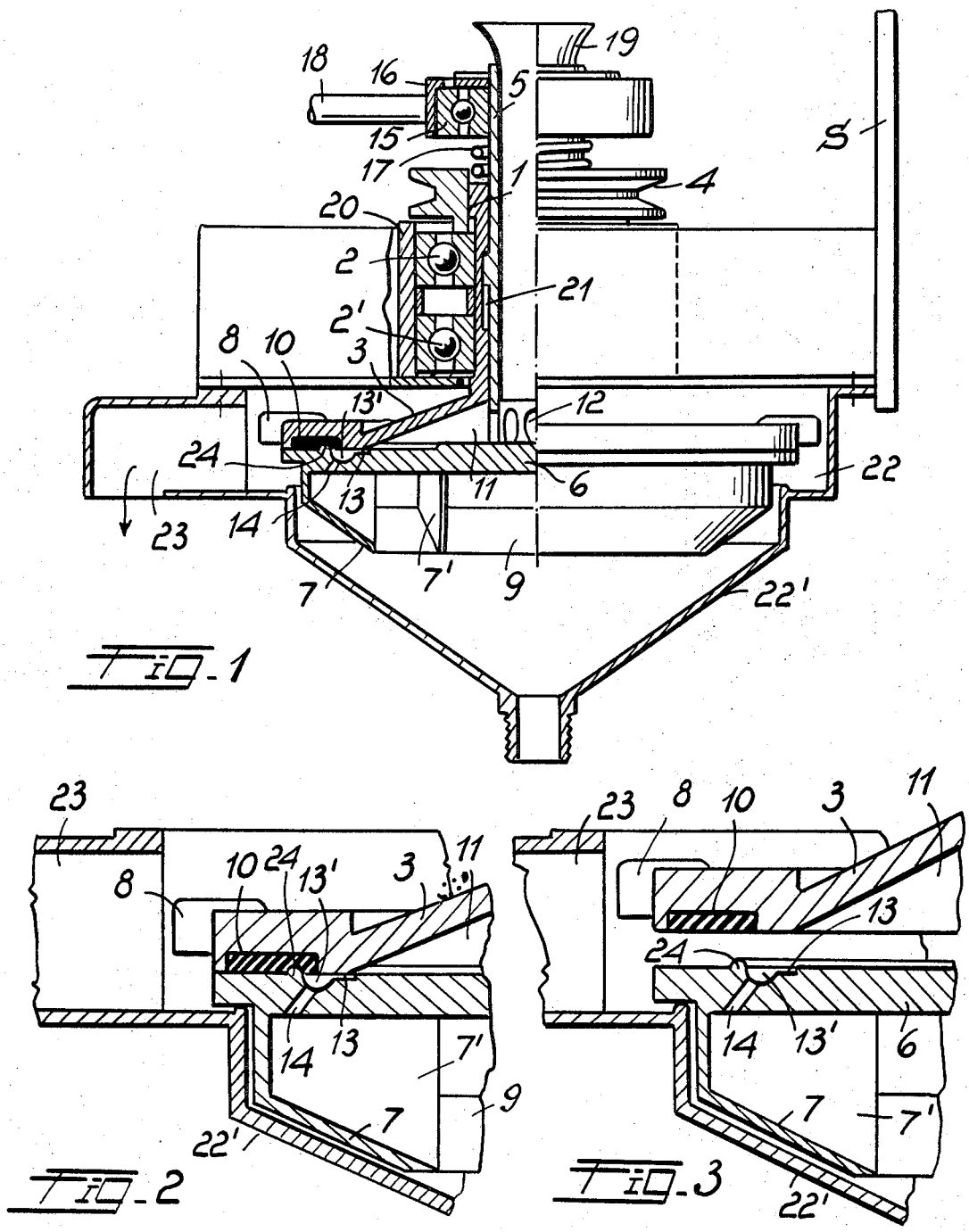

APPARATUS TO MAKE COFFEE CREAM BY MEANS OF CENTRIFUGATION

SUMMARY OF THE INVENTION

Several types of centrifuging apparatus to make coffee cream are already known on the market.

Such apparatus, up to this date, have not found suitable and wide spread use. Due to their structural faults, since on their inner walls scaling always occurs to a small or great extend with consequent clogging, there take place "nebulization" effects of the coffee cream due to the centrifuging action as well as losses of coffee powder outside the centrifuging chamber, and a faulty discharge of the deposits.

Therefore, the primary object of the present invention is to devise centrifuging apparatus for making coffee cream which obviates the above-mentioned drawbacks.

It is illustrated by way of example only and without limitation, in the accompanying drawings which show a preferred embodiment thereof and wherein:

DESCRIPTION OF THE INVENTION

FIG. 1 is a partially sectioned, front view of the apparatus; and

FIGS. 2 and 3 show a detail of the assembly of the two elements which comprise the centrifuging chamber, respectively, joined during the beverage preparation step, and separated during the ejection step of the used deposits.

DETAILED DESCRIPTION OF THE INVENTION

As may be seen from the drawings, the apparatus according to the invention, which is applicable to an automatic coffee dispenser or "espresso" coffee machine for bars, is essentially characterized, with respect to similar known types of apparatus, in that it presents a chamber to collect the rotating coffee cream, and, further, in that the chamber is provided underneath the centrifugation chamber to which it is suitably connected by means of holes, and the two elements which comprise the centrifuging chamber being separable consequent to the ejection, also by means of centrifuging of the coffee deposits, into another suitable outer chamber.

The coffee cream will flow down from the chamber where it is collected only when the centrifuge is at rest.

With the apparatus, which is the object of the present invention, there is obtained a perfect separation of the coffee cream from the used coffee powder, during the centrifuging step as well as during the coffee deposit discharge step, and the formation of the "nebulization" effect of the coffee cream, which causes the three disadvantages of dispersing the beverage, of humidifying the tubes which discharge the coffee deposits, and of rendering the beverage cold, is avoided to a maximum degree.

With the apparatus according to the invention, considerable progress is thus achieved from functional point of view as well as from the yield point of view.

Referring now in detail to the drawings, it will be noted that the apparatus comprises essentially two rotating portions, a lower one and an upper one.

The rotating upper portion is formed of an outer sleeve 1 which terminates at the bottom with a conical flange 3.

The rotating lower portion is formed of another sleeve 5, located inside sleeve 1, and being joined at its top to a locking flange 16 and at its bottom to a disc-flange 6 to which a downwardly extending frustoconical element 7 is connected.

The conical flange 3 and the disc-flange 6 define the centrifuging chamber 11.

Within the chamber the coffee power and the water penetrate, through the holes 12 provided at the base of the inner sleeve 5, coming from the upwardly directed tube 19 having a flared upper end and being inserted within the inner sleeve 5.

The disc-flange 6 and the frustoconical element 7 define the collection chamber 9 for the coffee cream, which is formed in the centrifuging chamber 11, and arrives, in the collection chamber 9 crossing a lower ring portion 13, which constitutes a filtering area, a circular groove 13', and through-holes 14 provided, respectively, upon and through the flange 6, the holes 14 being outwardly inclined.

Several fins 7' extend perpendicularly from the inner peripheral surface of element 7, so as to avoid the continuation of motion of the coffee cream collected in, the chamber 9 at the end of the rotation step.

In flange 16 a bearing 15 is housed within which the upper end of the inner sleeve 5 is rotatably mounted and with it the lower rotating portion.

A supporting bush 20 is keyed on sleeve 1 and locks a pair of bearings 2,2', within which the upper end of the outer sleeve 1 is rotatable mounted and with it, the upper rotating portion.

Between bearing 15 and bearing 2 a pulley 4 which is secured fast to the sleeve 1, and on top retention spring 17, are provided.

The sleeves 1 and 5 are joined to each other at 21 by means of a key or the like, whereby, they are axially slidable relative to one another.

Rotation may be imparted to the rotating portions by means of pulley 4.

When the coffee deposits have to be discarded, the detachment of collection chamber 9 for the coffee cream, from flange 3 may be obtained by pushing flange 16 downwardly by means of a lever 18 or any other suitable means.

According to the embodiment of the apparatus shown in FIG. 1, it is supposed that it is fast with the fixed structure S of an automatic coffee dispenser; and collection of the coffee deposits takes place in an annular chamber 22, having a tangential discharge 23. The chamber 22 is provided by the upper portion of a funnel-shaped member 22' which is fixed to the base of said structure S. The member 22' has a diameter bigger than the disc-flange 6, and is adapted to contain the centrifuging chamber 11 and the chamber 9 for the collection of the coffee cream.

Suitable fins 8 provided on the outside periphery of flange 3 build up a vortex in the annular chamber 22, thus pushing, during the ejection step (by means of separation of flange 3 from disc-flange 6) the coffee deposits into the discharge 23.

Centrifuging is thus obtained to a maximum extend in the apparatus according to the invention, thus serving not only to filter the water through the coffee powder so as to make the aromatic brew, but also to collect the latter separately for avoiding "nebulization" of same, and in addition to convey the used coffee deposits to the discharge.

In addition, in the drawing may be seen a gasket 10 set in the lower face of the flange 3 and an annular ridge 24 extending upwardly from the flange 6, which ensure sealing between the rotating flanges 3 and 6 when they are close together.

Heretofore a preferred embodiment of the apparent according to the invention has been described, but as will be evident to those skilled in the art, other embodiments of said apparatus may be obtained by making certain variations, without departing from the scope of the invention, which is based essentially, as already mentioned, upon the presence of a chamber for the collection of the coffee cream, which is also rotating.

Among the possible variations the chamber for the collection of the coffee cream may be provided outside the centrifuging chamber instead of being underneath it.

I claim:

1. A centrifuging apparatus into which coffee powder and water are introduced for making coffee cream, that is, liquid coffee separated from coffee deposits, comprising a first rotatably mounted wall means, and a second rotatably mounted wall means cooperatively engaged with said first wall means for rotation therewith, said first and second wall means cooperating to form a centrifuging chamber arranged to receive the coffee powder and water, and said second wall means forming a separate collection chamber which rotates with said centrifuging chamber and is arranged in communication with said centrifuging chamber for receiving coffee cream therefrom separated from the coffee deposits retained within said centrifuging chamber.

2. A centrifuging apparatus, as set forth in claim 1, wherein said first wall means comprising an upright outer sleeve and a frustoconically shaped flange secured to and extending outwardly from the lower end of said sleeve, said second wall means comprising an upright inner sleeve positioned within said outer sleeve, a disc flange positioned at and extending radially outwardly from the lower end of said second sleeve and being located below said frustoconically shaped flange, and a wall member secured to and extending downwardly from said disc flange, said frustoconically shaped flange and said disc flange cooperating to form the centrifuging chamber, and said disc flange and said wall member cooperating to form the collection chamber.

3. A centrifuging apparatus, as set forth in claim 2, wherein a bushing being located radially outwardly from said outer sleeve, first bearing means located within said bushing for rotatably supporting said outer sleeve, a locking flange secured to and extending outwardly from the upper end of said inner sleeve and being located above the upper end of said inner sleeve, and a second bearing means mounted within said locking flange and spaced upwardly from said first bearing means for rotatably supporting said inner sleeve.

4. A centrifuging apparatus, as set forth in claim 3, wherein a retention spring encircles said inner sleeve and extends between and in contact with the upper end of said outer sleeve and the lower end of the said bearing means within said locking flange.

5. A centrifuging apparatus, as set forth in claim 3, wherein a tube located within and extending upwardly through said inner sleeve being arranged to deliver coffee powder and water into the said inner sleeve, said inner sleeve having a plurality of openings in its lower end for admitting the coffee powder and water from its lower end into said centrifuging chamber.

6. A centrifuging apparatus, as set forth in claim 3, wherein said inner sleeve and said outer sleeve being interengaged for affording relative axial movement therebetween, and means associated with said locking flange for displacing said inner sleeve downwardly and for separating said disc flange downwardly from said frustoconically shaped flange for discharging used coffee deposit from the outer periphery of said centrifuging chamber.

7. A centrifuging apparatus, as set forth in claim 6, wherein the radially outer and upper surface of said disc flange being in sealed contact with the radially outer and lower surface of said frustoconically shaped flange, whereby in exerting a downward force on said inner sleeve the sealed contact between said disc flange and said frustoconically shaped flange is discontinued.

8. A centrifuging apparatus, as set forth in claim 7, wherein third wall means laterally enclosing said frustoconically shaped flange and said disc flange and forming an annular collection space located radially outwardly from the outer periphery of said centrifuging chamber for receiving used coffee deposits from said centrifuging chamber, and an outer opening from said collection space for discharging the used coffee deposits therefrom.

9. A centrifuging apparatus, as set forth in claim 8, wherein a plurality of fins being affixed to the outer periphery of said frustoconically shaped flange and being located within said collection space whereby during rotation of said flange a vortex action is established for discharging coffee deposit from said collection space through said outlet therefrom.

10. A centrifuging apparatus, as set forth in claim 8, wherein said third wall means comprises a funnel shaped section extending downwardly below said collection space and being located below said collection chamber.

11. A centrifuging apparatus, as set forth in claim 8, wherein a fixed support structure being located adjacent said inner and outer sleeves, said inner and outer sleeves being secured to said support structure, said third wall means being secured to said support structure, for supporting the centrifuging apparatus during the centrifuging movement thereof.

12. A centrifuging apparatus, as set forth in claim 7, wherein an annular shaped gasket member being fitted into a recess in the lower face of said frustoconically shaped flange at a position spaced outwardly from the outer periphery of said centrifuging chamber, and an annular protuberance extending upwardly from the upper face of said disc flange aligned below said gasket and being arranged to cooperate with said gasket for forming a seal between the mating surfaces of said frustoconically shaped flange and disc flange.

13. A centrifuging apparatus, as set forth in claim 12, wherein a shallow annular recess located in the upper surface of said disc flange at the outer periphery of and opens to said centrifuging chamber, an annular groove of greater depth than said recess being positioned in the upper surface of the said disc flange contiguous with said recess and located outwardly from said centrifuging chamber, and a plurality of openings extending through said disc flange from said groove to said collection chamber, said openings extending outwardly and downwardly through said disc flange, whereby the coffee cream from said centrifuging chamber flows outwardly through said recess, said groove, and said openings into said collection chamber.

14. A centrifuging apparatus, as set forth in claim 2, wherein a plurality of fins, being secured to the inner surface of said wall member and extending perpendicularly therefrom inwardly into said collection chamber for discontinuing the rotational movement of the coffee cream within said collection chamber received from said centrifuging chamber.

15. A centrifuging apparatus, as set forth in claim 2, wherein said collection chamber for the coffee cream being located radially outwardly from the centrifuging chamber.